United States Patent
Hallouin et al.

(10) Patent No.: US 11,333,025 B2
(45) Date of Patent: May 17, 2022

(54) TURBINE STATOR BLADE COOLED BY AIR-JET IMPACTS

(71) Applicant: SAFRAN HELICOPTER ENGINES, Bordes (FR)

(72) Inventors: Baptiste Hallouin, Moissy-Cramayel (FR); Jean-Maurice Casaux-Bic, Moissy-Cramayel (FR); Alexandre Montpellaz, Moissy-Cramayel (FR); Lionel Renault, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 17/040,349

(22) PCT Filed: Mar. 20, 2019

(86) PCT No.: PCT/FR2019/050639
§ 371 (c)(1),
(2) Date: Sep. 22, 2020

(87) PCT Pub. No.: WO2019/180382
PCT Pub. Date: Sep. 26, 2019

(65) Prior Publication Data
US 2021/0087938 A1     Mar. 25, 2021

(30) Foreign Application Priority Data
Mar. 23, 2018  (FR) ...................... 18 52545

(51) Int. Cl.
*F01D 5/18*  (2006.01)
(52) U.S. Cl.
CPC .......... *F01D 5/189* (2013.01); *F05D 2220/30* (2013.01); *F05D 2250/11* (2013.01); *F05D 2250/13* (2013.01); *F05D 2260/201* (2013.01)

(58) Field of Classification Search
None
See application file for complete search history.

(56) References Cited

U.S. PATENT DOCUMENTS

| 5,533,864 A | 7/1996 | Nomoto et al. |
| 7,497,655 B1 * | 3/2009 | Liang ..................... F01D 5/189 |
| | | 415/1 |

(Continued)

FOREIGN PATENT DOCUMENTS

| EP | 1 284 338 A2 | 2/2003 |
| EP | 1 503 038 A1 | 2/2005 |

(Continued)

OTHER PUBLICATIONS

International Search Report dated Jun. 14, 2019 in PCT/FR2019/050639 filed on Mar. 20, 2019, 3 pages.

(Continued)

*Primary Examiner* — Michael Lebentritt
(74) *Attorney, Agent, or Firm* — Oblon, McClelland, Maier & Neustadt, L.L.P.

(57) ABSTRACT

A turbomachine blade formed of a hollow airfoil having a leading edge and a trailing edge opposed to each other and connected by an intrados wall and an extrados wall each extending along a radial axis of the blade, between a blade root and a blade tip, and including a cooling circuit supplied with air and delivering air jets ensuring through multiple perforations of the cooling circuit an impingement cooling of the inner surface of the airfoil, the cooling circuit includes superimposed cooling channels over the height of the blade, each integrated into the inner surface of the airfoil while matching its contour, the multiple perforations being drilled in the cooling channels terminating in a purge cavity of the (Continued)

airfoil are able to ensure a purge of the air having impinged the inner surface of the airfoil after its passage through the perforations.

10 Claims, 3 Drawing Sheets

(56) References Cited

U.S. PATENT DOCUMENTS

| | | | | |
|---|---|---|---|---|
| 7,556,476 | B1* | 7/2009 | Liang | F01D 5/188 415/115 |
| 8,047,789 | B1* | 11/2011 | Liang | F01D 5/147 416/97 R |
| 8,100,654 | B1* | 1/2012 | Liang | F01D 5/187 416/97 R |
| 8,292,582 | B1* | 10/2012 | Liang | F01D 5/187 416/97 R |
| 8,303,253 | B1* | 11/2012 | Liang | F01D 5/189 416/97 R |
| 8,342,802 | B1* | 1/2013 | Liang | F01D 5/188 416/96 A |
| 8,491,264 | B1* | 7/2013 | Liang | F01D 5/187 416/97 R |
| 8,500,401 | B1* | 8/2013 | Liang | F01D 5/186 416/1 |
| 2003/0031555 | A1 | 2/2003 | Noe et al. | |
| 2005/0025623 | A1 | 2/2005 | Botrel et al. | |
| 2006/0153679 | A1* | 7/2006 | Liang | F01D 5/187 416/97 R |
| 2006/0222494 | A1* | 10/2006 | Liang | F01D 5/187 416/97 R |
| 2009/0324385 | A1* | 12/2009 | Liang | F01D 5/187 415/115 |
| 2013/0104567 | A1* | 5/2013 | Konitzer | F01D 5/189 60/806 |
| 2014/0099189 | A1* | 4/2014 | Morris | F01D 5/186 415/115 |
| 2015/0184537 | A1* | 7/2015 | Smith | F01D 25/12 416/97 R |
| 2016/0222806 | A1 | 8/2016 | Jennings | |
| 2016/0333735 | A1* | 11/2016 | Bunker | F01D 9/023 |
| 2017/0234154 | A1 | 8/2017 | Downs | |
| 2018/0045055 | A1 | 2/2018 | Brzek et al. | |
| 2018/0163545 | A1* | 6/2018 | Bang | F01D 5/187 |

FOREIGN PATENT DOCUMENTS

| | | |
|---|---|---|
| FR | 2 769 947 A1 | 4/1999 |
| JP | 4-179802 A | 6/1992 |
| WO | WO 2015/095253 A1 | 6/2015 |

OTHER PUBLICATIONS

French Preliminary Search Report (with English translation of categories) dated Oct. 17, 2018 in French Application No. 18 52545 filed on Mar. 23, 2018, 4 pages.

* cited by examiner

TURBINE STATOR BLADE COOLED BY AIR-JET IMPACTS

BACKGROUND OF THE INVENTION

The present invention relates to the general field of blade assemblies for a turbomachine turbine, and more particularly to the turbine blades fitted with integrated cooling circuits.

In a manner known per se, a turbomachine includes a combustion chamber in which air and fuel are mixed before being burned therein. The gases resulting from this combustion flow downstream of the combustion chamber and then supply a high-pressure turbine and a low-pressure turbine. Each turbine includes one or several rows of fixed blades (called diffuser) alternating with one or several rows of movable blades (called impellers), spaced circumferentially all around the rotor of the turbine. These turbine blades are subjected to the very high temperatures of the combustion gases which reach values significantly greater than those that the blades in direct contact with these gases can withstand without damage, which has the consequence of limiting their service life.

In order to solve this problem, it is known to provide these blades with internal cooling circuits aiming at reducing their temperature by creating, inside the blade, an organized circulation of this air and, in the wall of the blade, perforations intended to cool the blade by forced convection.

FIGS. 5 and 5A illustrate a conventional cooled blade structure of the through insert (or jacket) type currently fitted to the diffusers of numerous aeronautical engines.

The blade 10 which includes a hollow airfoil 12, inserted between an outer platform 14 at the blade tip and an inner platform 16 at the blade root, includes a metal insert 18 which defines an annular peripheral cavity 20 between the inner surface of the airfoil and the external surface of the insert. At its upper part 18A, this metal insert is sealingly fixed to the outer platform of the blade by welding or brazing and its lower part 18B embeds into the inner platform of the blade at a guide area or slide 16A, providing a determined clearance necessary for the mounting and the sliding of the insert under the effects of the thermal expansion. Studs 22 secured to the inner surface or formed by bosses of the insert maintain a constant spacing between the insert and this inner surface.

This through insert 18 is of the multi-perforated type so that the cooling air flow rate delivered by a source of pressurized air, in general, the compressor of the turbomachine, enters the outer platform 14 through an inlet orifice 24 generally disposed at the blade tip, arrives inside the insert 18 and partly escapes through the multiple holes or perforations 25 of this insert by forming in the peripheral cavity 20 air jets which impingement cool the inner surface of the airfoil 12, then are discharged through calibrated drilling 26 made on the trailing edge or preferably on the intrados wall 12C of this airfoil in order to form a protective air film along this trailing edge. The remaining cooling air flow rate exits through the inner platform 16 through which it passes by cooling it to escape outside the blade via an outlet orifice 28 generally disposed at the blade root, towards other members of the engine such as discs that also require a cooling.

This conventional structure is generally satisfactory because this type of air impingement cooling is particularly effective. However, the integration of the insert into the hollow airfoil is expensive, leaky and the control of the distance between the insert and the inner surface of the airfoil is relatively delicate. Not adding the insert would therefore lead to many advantages: decrease in the production cost, sealing of the cooling system, compactness and control of the distance between the insert and the airfoil and it was therefore possible to consider a solution with integrated insert by additive manufacturing which is more compact and more repeatable.

However, the disadvantages of such an cooling with integrated insert by additive manufacturing are numerous and in particular related to the manufacturability on a unitary diffuser whose manufacturing direction is imposed and can only be that of the drive axis. Indeed, any other choice in the manufacturing direction would lead to having a manufacturing direction per blade, which is impossible to implement without significantly increasing the production costs. In addition, this direction (according to the drive axis) implies that the insert is manufactured in the "vacuum" and thus that some surfaces called "downskin" are therefore likely to collapse.

In addition, when the insert is a through insert, the cooling air of a diffuser blade is taken from an air stream which passes through the insert and the cooling circuit and the through air stream must then be separated. This requires having sealed connections between the insert and the walls of the airfoil. However, for the sealing of the cooling circuit to be perfect, it would therefore be necessary to embed it at both ends by integrating it directly into the blade, which, given the fact that the average temperature of the insert is much lower than that of the airfoil (on the order of a hundred degrees), is not possible because the insert would then be mechanically too stressed. In practice, therefore only one end of the insert could be embedded and linked to the airfoil by a sliding and very narrow adjustment on the order of 0.01 mm which allows ensuring a satisfactory sealing of the cooling circuit. However, to this day, it is impossible to achieve such a narrow adjustment because the additive manufacturing currently allows only minimum clearances greater than 0.2 mm (which is 20 times greater than the desired adjustment).

OBJECT AND SUMMARY OF THE INVENTION

The present invention therefore aims at overcoming the aforementioned drawbacks by proposing an impingement cooled turbomachine blade which is: thermally effective, that is to say which allows dissipating a high thermal power by using a moderate air flow rate; sealed, that is to say which allows ensuring that the air mobilized is only dedicated to the cooling of the blade (the higher the sealing of the device the greater its overall effectiveness); compact, that is to say the integration of the cooling device must minimize its impingement on the overall dimension of the engine; cost-effective, that is to say the production cost of the cooling device must be the lowest possible and finally which can be manufactured by additive manufacturing. It also relates to any turbomachine turbine fitted with such cooled blades per through insert.

To this end, a turbomachine blade is provided, formed of a hollow airfoil having a leading edge and a trailing edge opposite to each other and connected by an intrados wall and an extrados wall each extending along a radial axis of the blade, between a blade root and a blade tip, the blade comprising a cooling circuit supplied with air and delivering air jets ensuring through multiple perforations of said cooling circuit, an impingement cooling of an inner surface of the airfoil, characterized in that said cooling circuit includes a plurality of superimposed cooling channels over all or part of the height of the blade, each disposed perpendicularly to said radial axis of the blade and integrated into said inner surface of the airfoil while matching its contour, said multiple perforations being drilled in each of said cooling channels whose ends terminating in a purge cavity of said airfoil are able to ensure a purge of the air having impinged said inner surface of the airfoil after its passage through said multiple perforations.

In this way, a cooling structure is obtained whose manufacturability by additive manufacturing is ensured while strongly decreasing the thermal gradients by conduction at the blade.

Advantageously, said cooling channels include a triangular or trapezoidal section.

Preferably, said multiple orifices of each of said cooling channels are drilled in one at least of the walls of said cooling channels and are aligned in column above each other along a radial axis of the blade.

Advantageously, said ends of said cooling channels terminate in said purge cavity in the vicinity of calibrated emission holes passing through said intrados wall of the airfoil.

Preferably, said calibrated emission holes have the same number as that of said cooling channels in the extension of the ends of which they are disposed.

Advantageously, said cooling channels are connected by transverse channels such that the cooling air can freely circulate from one cooling channel to another thus forming a grid network of channels integrated into said inner surface of the airfoil.

Preferably, said multiple orifices are drilled at the intersection of the cooling channels with the transverse channels or along the transverse channels.

BRIEF DESCRIPTION OF THE DRAWINGS

Other characteristics and advantages of the present invention will emerge from the description given below, with reference to the appended drawings which illustrate an exemplary embodiment without any limitation and on which.

DETAILED DESCRIPTION OF THE INVENTION

Figure 1A:
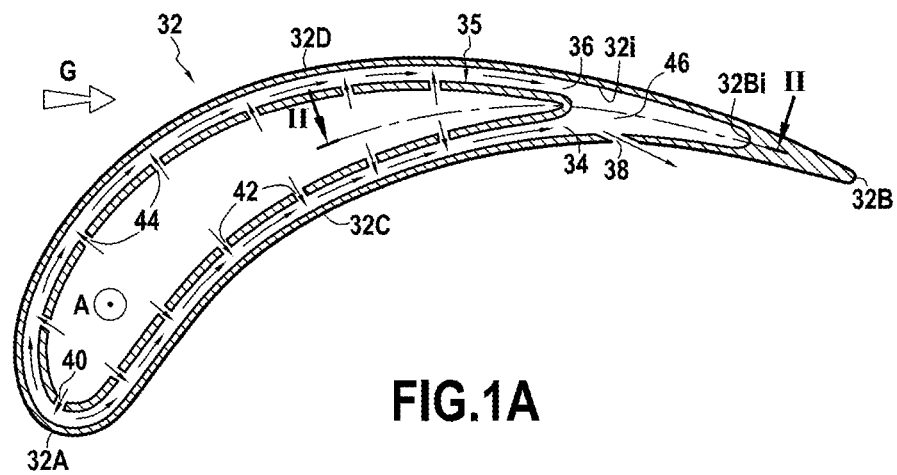
FIG. 1A is a sectional view at a horizontal cooling channel of a turbine diffuser in a first exemplary embodiment according to the invention.
Figure 1B:
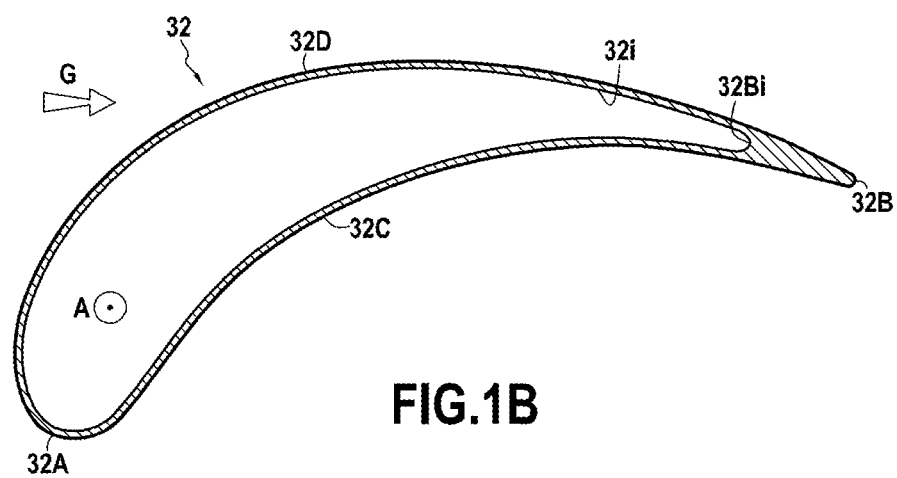
FIG. 1B is a sectional view, excluding the cooling channel, of a turbine diffuser in a first exemplary embodiment according to the invention.

FIGS. 1A and 1B represent in axial section a cooled blade assembly, for example a turbine diffuser of a turbomachine according to the present invention. This blade formed of a hollow airfoil 32 is fixed to a casing (not represented) of the turbine in the flow path of the combustion gases through the turbine whose direction of flow of these gases is illustrated by the arrow referenced G in the figure. A leading edge 32A and a trailing edge 32B opposite to each other and intrados 32C and extrados 32D walls extending radially between a blade root and a blade tip are defined for this airfoil 32.

Such a blade is subjected to the very high temperatures of the combustion gases and therefore needs to be cooled. For this purpose, a cooling circuit supplied with cooling air at one of its radial ends (the cooling air stream which, in the figure, moves along a radial axis of the blade, from the blade tip to the blade root, is represented by the arrow referenced A), is formed by a plurality of channels 35 preferably independent of each other, adjacent or not, superimposed over all or part of the height of the blade and integrated into the inner surface of the airfoil 32$i$ (that is to say secured thereto) while matching its contour, except for a vicinity of the trailing edge. The overall dimension in the area of the trailing edge indeed does not allow integrating these channels thereinto, this trailing edge is therefore cooled by the purge of the impingements, represented by the arrows 34 and 36, through which the cooling air re-heated by the contact with the wall of the blade is expelled (also said to be purged) before being discharged through calibrated emission holes or vents 38 made nearby in the intrados wall 32C of this airfoil, in order to form a protective air film along the trailing edge 32B. This cooling air derived from the air jets having impinged the inner surface of the airfoil 32$i$ had been previously introduced into these channels 35 by several orifices drilled through their wall, at least one of which 40 being in the extension of the leading edge 32A, one or several one of which 42 facing the intrados wall 32C and one or several one of which 44 facing the extrados wall 32D. These different orifices are aligned advantageously in column above each other over all or part of the height of the blade along the radial axis of the blade.

Figure 2:
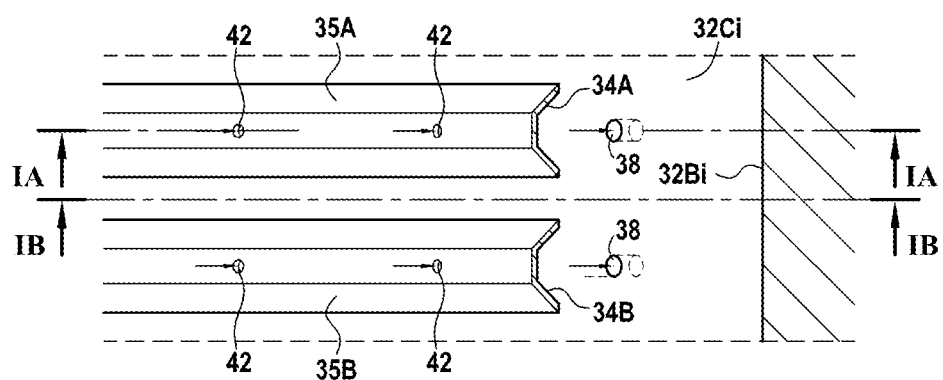
FIG. 2 is a view along the plane II of FIG. 1A.
Figure 4:
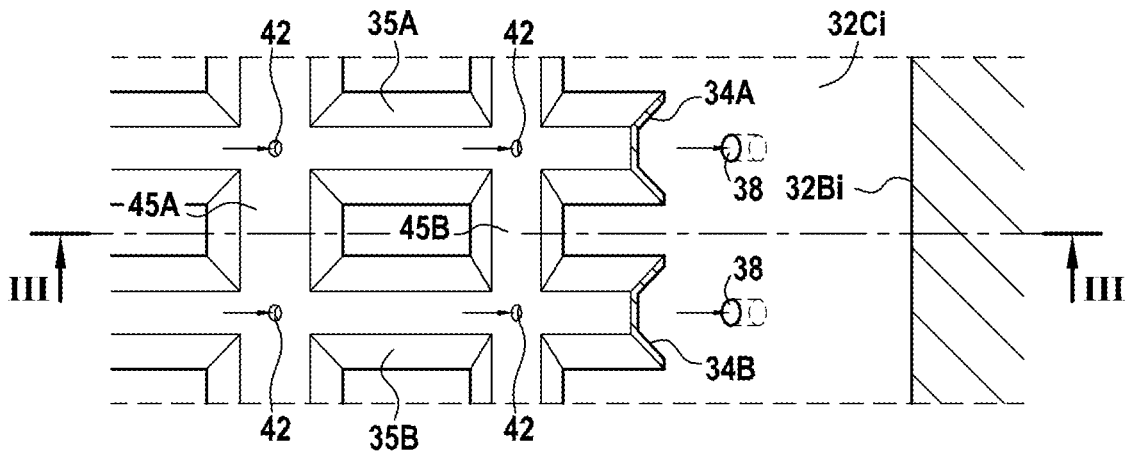
FIG. 4 is a view along the plane IV of FIG. 3, and FIGS. 5 and 5A are a perspective and sectional view of a turbine diffuser of the prior art.
Figure 5:
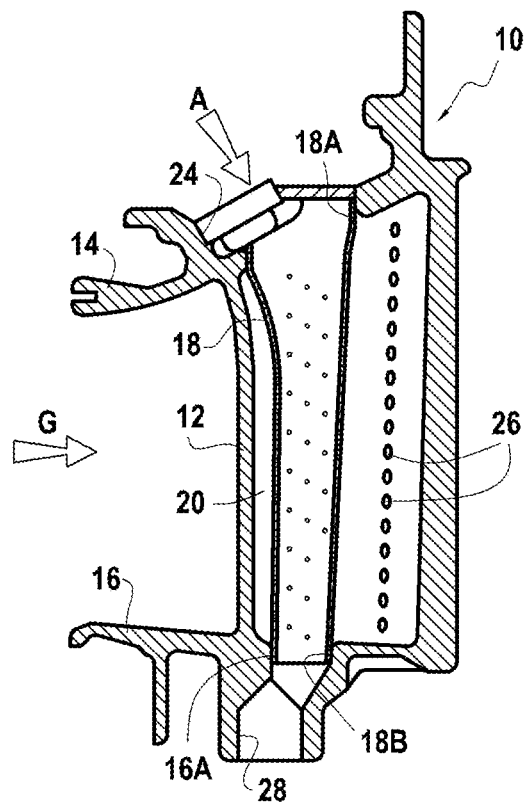
Figure 5A:
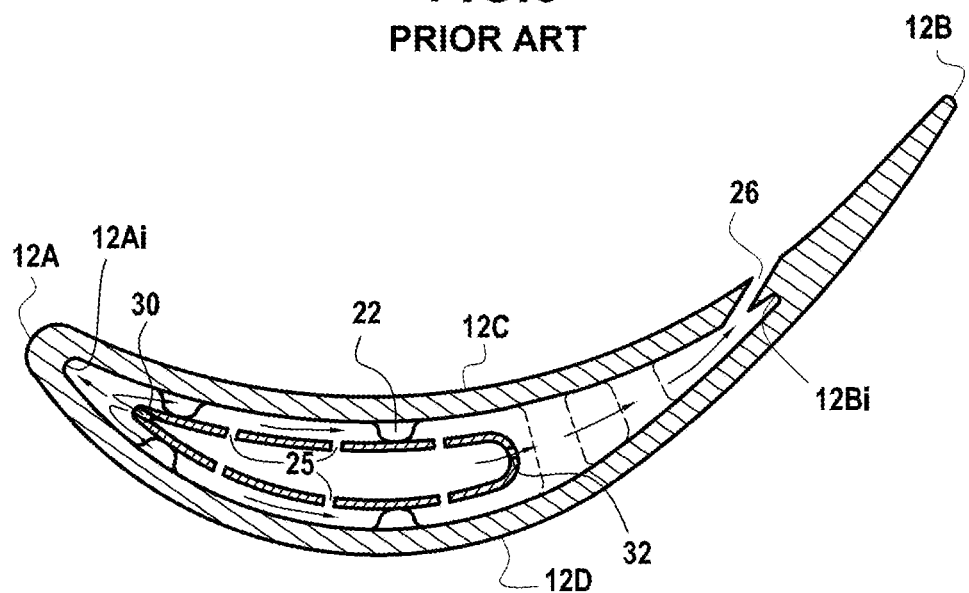

FIGS. 2 and 4 are elevational views of part of the intrados inner surface 32Ci of the blade up to its trailing edge according to two embodiments of the different cooling circuit.

FIG. 2 represent for example two cooling channels 35A, 35B superimposed but not adjacent to each other and having in this example a trapezoidal section. The inner surface of the airfoil forms the large base of the trapezoidal section opposite which the small base of this trapezoidal section constituting a wall of the cooling channel is drilled with the orifices 42 for the passage of the air jets ensuring the impingement cooling of the inner surface of the facing airfoil 32$i$. Once these impingements are made, the re-heated air is naturally purged through the ends 34, 36 of the channel (depending on whether the impingement is made on the intrados or extrados inner surface, the purge is made by either of the ends, the purge of the impingement on the inner surface of the leading edge being however distributed on these two ends) then discharged through the calibrated emission holes 38 passing through the intrados wall 32C of the airfoil and which have preferably, as illustrated and not necessarily, the same number as that of the channels in the extension of the ends of which they are disposed.

This cooling solution is perfectly sealed because the channels open each into an independent purge cavity 46 of the main cavity in which the stream A circulates. It will be noted that the channels 35 can also be directly connected to the vents 38. In this case, the number of vents is identical to the number of channels. In addition, as the cooling circuit is deeply linked to the blade, the thermal gradients by conduction likely to crack an insert which would be linked at its both ends like those of the prior art, are reduced.

It will be noted that if the cooling channels 35 have been illustrated with a trapezoidal section, it is obvious to those skilled in the art that a triangular section or any other section easily obtainable by additive manufacturing, for example in the form of an arch, is of course possible. Likewise, if the orifices 42 have been represented on the wall of the channel forming the small base of the trapezoidal section, it is obvious that these orifices can also be drilled on the inclined walls of this trapezoidal section.

Figure 3:
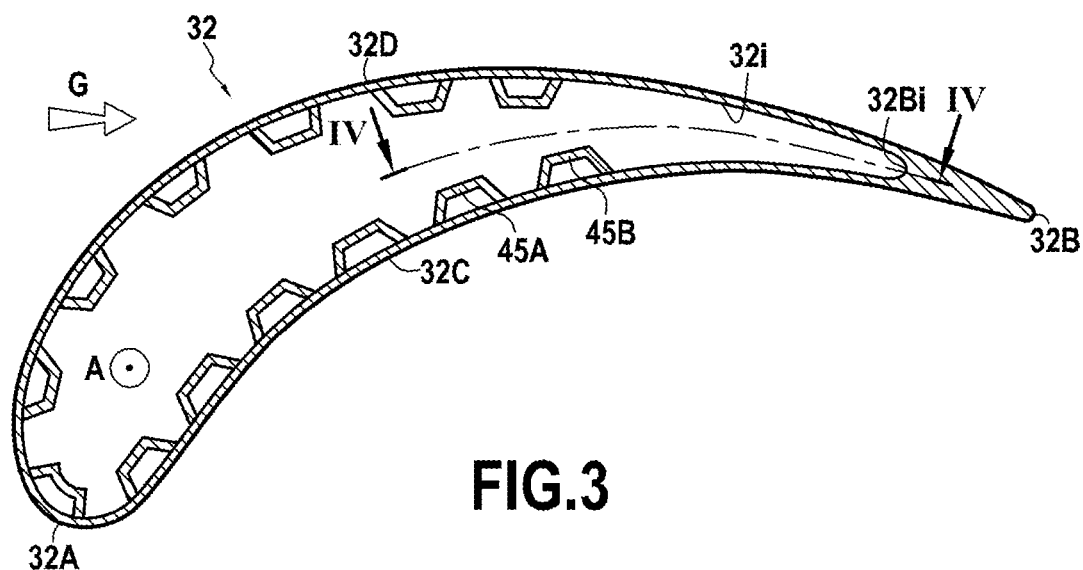
FIG. 3 is a sectional view passing through the vertical cooling channels of a turbine diffuser in a second exemplary embodiment according to the invention.

In FIGS. 3 and 4, which represent a second embodiment of the cooling circuit, the cooling channels 35A, 35B ensuring the purge of the air impingement are connected by transverse channels 45A, 45B, ensuring the recovery of the air jet impingements, such that the cooling air can freely circulate from one cooling channel to another thus forming a grid network of channels integrated into the inner surface of the airfoil 23i. If, for the sake of simplification of the drawing, the orifices 42 for the passage of the air jets have been represented at the intersection of the channels, this positioning is not mandatory and a different positioning along the transverse channels is also possible. More specifically, it is also preferable that the air jets are not located at the intersections to limit shear of the impingements by the purge of the impingements located upstream.

Thus, with this configuration, it becomes possible to make air jet impingement cooling without having to use an insert, which is particularly interesting for at least two reasons: the circuit mobilizes very high convective exchange coefficients (in the area of the impingements), which makes the cooling very effective, and it can be used in architectures where the pressure gradients of the cooling air are low unlike lattice cooling solutions which, constituting a low permeability medium, promote the convective exchanges because these structures have a very high exchange surface to volume ratio.

Of course, if the description has been made essentially in relation to a turbomachine turbine, it is obvious that such a blade structure cooled by integrated cooling channels can be easily applied to a turbomachine compressor stator as well as to a turbomachine casing arm.

The invention claimed is:

1. A turbomachine blade formed of a hollow airfoil having a leading edge and a trailing edge opposite to each other and connected by an intrados wall and an extrados wall each extending along a radial axis of the blade, between a blade root and a blade tip, the blade comprising a cooling circuit supplied with air and delivering air jets ensuring through multiple orifices of said cooling circuit, an impingement cooling of an inner surface of the airfoil, wherein said cooling circuit includes a plurality of superimposed cooling channels over all or part of a height of the blade, each disposed perpendicularly to said radial axis of the blade and integrated into said inner surface of the airfoil while matching its contour, said multiple orifices being drilled in each of said cooling channels whose ends terminating in a purge cavity of said airfoil ensure a purge of the air having impinged said inner surface of the airfoil after its passage through said multiple orifices.

2. The blade according to claim 1, wherein said cooling channels include a triangular or trapezoidal section.

3. The blade according to claim 1, wherein said multiple orifices of each of said cooling channels are drilled in one at least of the walls of said cooling channels.

4. The blade according to claim 1, wherein said multiple orifices are aligned in column above each other along a radial axis of the blade.

5. The blade according to claim 1, wherein said ends of said cooling channels terminate in said purge cavity in the vicinity of calibrated emission holes passing through said intrados wall of the airfoil.

6. The blade according to claim 5, wherein the blade includes a same number of said calibrated emission holes as said cooling channels in the extension of the ends of which they are disposed.

7. The blade according to claim 1, wherein said cooling channels are connected by transverse channels such that the cooling air can freely circulate from one cooling channel to another thus forming a grid network of channels integrated into said inner surface of the airfoil.

8. The blade according to claim 7, wherein said multiple orifices are drilled at the intersection of the cooling channels with the transverse channels or along the transverse channels.

9. The blade according to claim 1 obtained by additive manufacturing.

10. A turbomachine turbine, comprising a plurality of blades according to claim 1.

* * * * *